US011442333B2

(12) United States Patent
Chen et al.

(10) Patent No.: US 11,442,333 B2
(45) Date of Patent: Sep. 13, 2022

(54) IMAGE DISPLACEMENT DEVICE

(71) Applicant: Young Optics Inc., Hsinchu (TW)

(72) Inventors: Ming-Chih Chen, Hsinchu (TW); Ya-Ling Hsu, Hsinchu (TW)

(73) Assignee: YOUNG OPTICS INC., Hsinchu Science Park (TW)

( * ) Notice: Subject to any disclaimer, the term of this patent is extended or adjusted under 35 U.S.C. 154(b) by 438 days.

(21) Appl. No.: 16/445,967

(22) Filed: Jun. 19, 2019

(65) Prior Publication Data
US 2020/0004105 A1 Jan. 2, 2020

(30) Foreign Application Priority Data
Jun. 29, 2018 (TW) .................. 107122533

(51) Int. Cl.
*G02F 1/29* (2006.01)
(52) U.S. Cl.
CPC .......... *G02F 1/292* (2013.01); *G02F 2203/22* (2013.01)
(58) Field of Classification Search
CPC .... G02B 21/367; G02B 26/0808; G02B 6/34; G02B 27/4272; G02B 27/4277; G02F 1/292; G02F 1/295; G02F 1/2955; G02F 2203/22
See application file for complete search history.

(56) References Cited

U.S. PATENT DOCUMENTS

| 6,570,684 | B1* | 5/2003 | Stone | G02B 6/2861 |
| | | | | 385/18 |
| 7,360,928 | B2 | 4/2008 | Moon et al. | |
| 8,016,429 | B2 | 9/2011 | Chang et al. | |
| 8,482,681 | B2 | 7/2013 | Wu | |
| 9,581,878 | B2 | 2/2017 | Xie et al. | |
| 2005/0103985 | A1* | 5/2005 | Stone | G06Q 10/107 |
| | | | | 250/216 |
| 2011/0181956 | A1* | 7/2011 | Iizuka | G02B 5/1866 |
| | | | | 359/573 |
| 2011/0181957 | A1* | 7/2011 | Iizuka | G02B 26/02 |
| | | | | 359/573 |

(Continued)

FOREIGN PATENT DOCUMENTS

| TW | I358598 B | 2/2012 |
| TW | I613503 B | 2/2018 |

(Continued)

*Primary Examiner* — Thomas A Hollweg
*Assistant Examiner* — Mary A El-Shammaa
(74) *Attorney, Agent, or Firm* — Muncy, Geissler, Olds & Lowe, P.C.

(57) ABSTRACT

An image displacement device includes a first grating and a second grating. Each grating is switchable between a diffracting state and a non-diffracting state. The first grating has a first surface and a second surface opposite the first surface, the first surface receives image beams, and the image beams leave the first grating by the second surface. The second grating is disposed downstream from the first grating in a light path and has a third surface and a fourth surface opposite the third surface. The third surface receives the image beams, and the image beams leave the second grating by the fourth surface. An exit direction of the image beam exiting the second grating is shifted a distance in a first direction from an incident direction of the image beam incident to the first grating.

20 Claims, 12 Drawing Sheets

(diffracting state)

(56) References Cited

U.S. PATENT DOCUMENTS

| | | | |
|---|---|---|---|
| 2016/0085300 A1* | 3/2016 | Robbins | G02B 27/0101 |
| | | | 345/633 |
| 2020/0004106 A1* | 1/2020 | Chen | G02F 1/292 |
| 2021/0033857 A1* | 2/2021 | Waldern | G02B 26/0808 |
| 2021/0252042 A1* | 8/2021 | Chen | A23L 2/52 |
| 2021/0373324 A1* | 12/2021 | Jarvenpaa | G02B 5/1819 |

FOREIGN PATENT DOCUMENTS

| | | |
|---|---|---|
| TW | 201819991 A | 6/2018 |
| WO | WO-2008142846 A1 | 11/2008 |

* cited by examiner

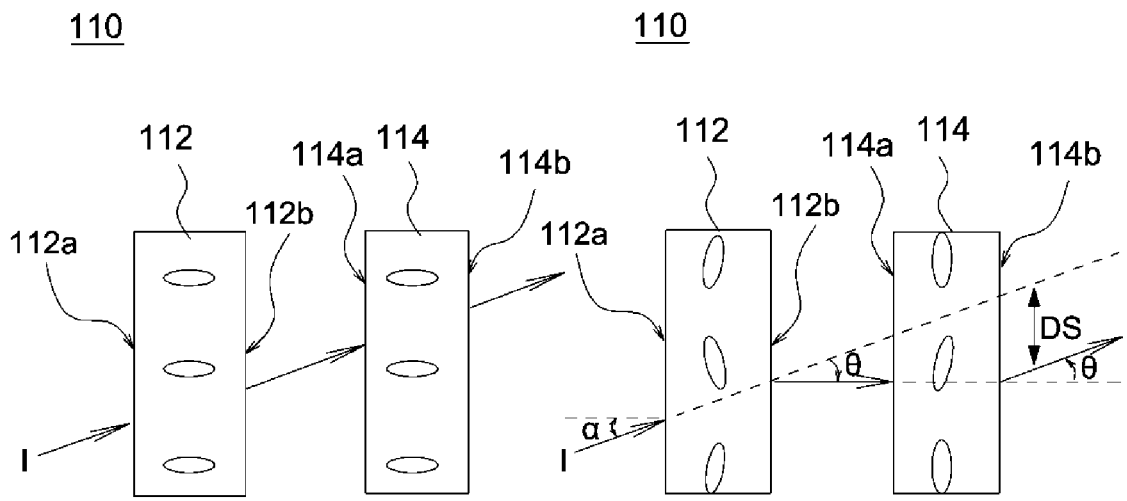
FIG. 2A (non-diffracting state)  FIG. 2B (diffracting state)
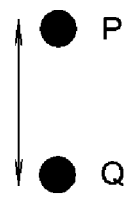
FIG. 3

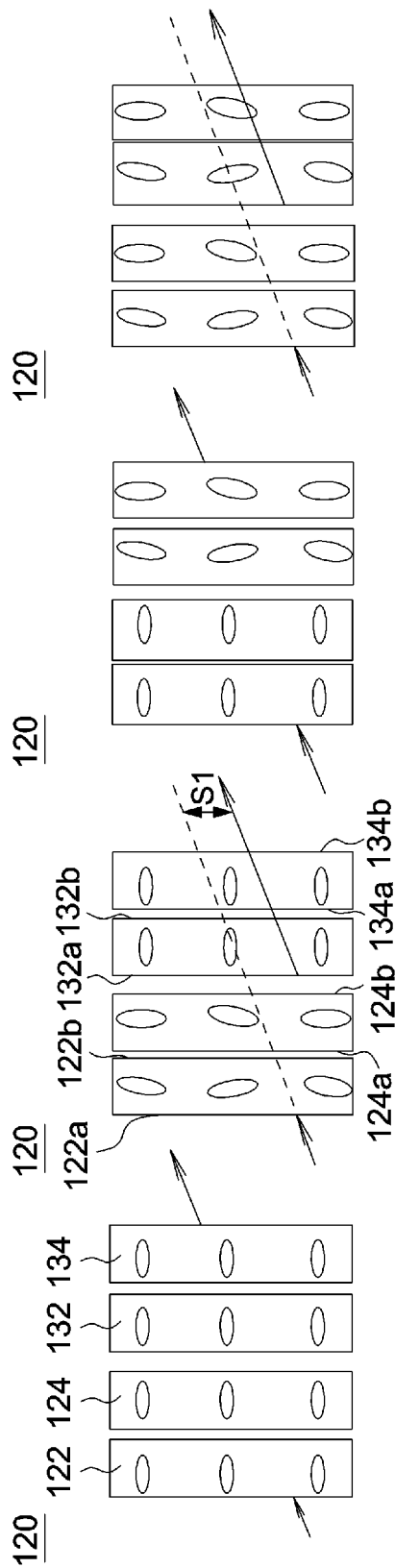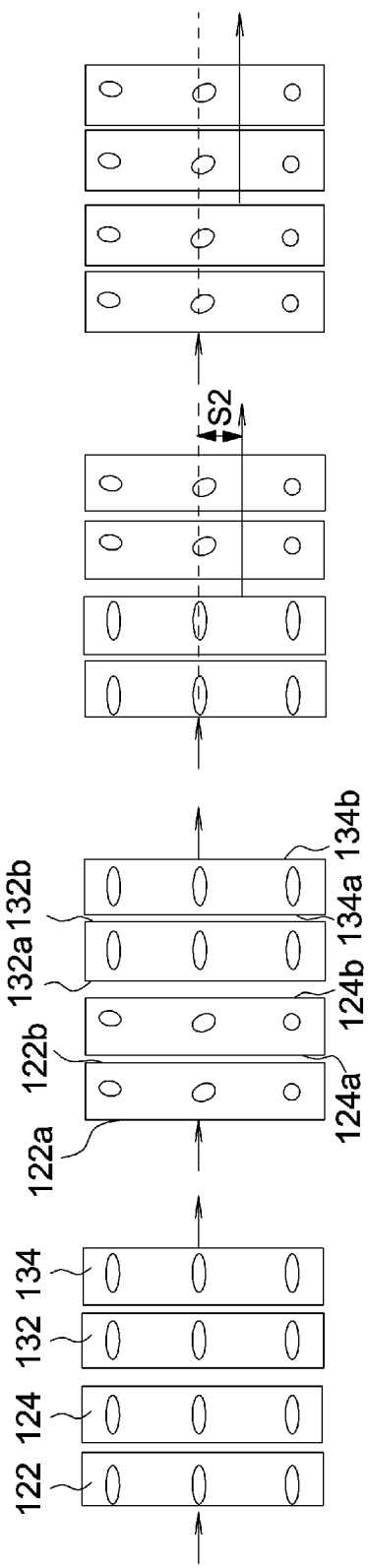

IMAGE DISPLACEMENT DEVICE

BACKGROUND OF THE INVENTION a. Field of the Invention

The invention relates generally to an optical device, and more particularly to an image displacement device.

b. Description of the Related Art

Nowadays, various image display technologies have been widely used in daily life. In a display apparatus, an image displacement device can be provided to modify or change light paths to enhance perceived image resolution, improve picture quality, or provide other beneficial effects. Typically, a conventional image displacement device may include a light path adjustment mechanism with a set of moving parts and a set of fixed parts to allow reciprocating motion of an optical element and therefore cause displacement of pixel images. Under the circumstance, the perceived image resolution is enhanced based on the visual effect known as persistence of vision. However, moving parts of a conventional image displacement device, normally swimming at a high speed, are liable to generate high-frequency noises and causes considerable vibrations to reduce service life of components. Moreover, the light utilization efficiency cannot be further improved because the light path adjustment mechanism has a comparatively longer transition time. Besides, in case a passive component (such as a light valve) varies in dimensions, the image displacement device needs to be re-designed to conform to the updated dimension and its materials and structures also needs to be re-verified to therefore complicate fabrication processes and entire assembly.

BRIEF SUMMARY OF THE INVENTION

According to one aspect of the present disclosure, an image displacement device includes a first grating and a second grating. Each of the first grating and the second grating is switchable between a diffracting state and a non-diffracting state. The first grating has a first surface and a second surface opposite the first surface, the first surface receives image beams, and the image beams leave the first grating by the second surface. The second grating is disposed downstream from the first grating in a light path and has a third surface and a fourth surface opposite the third surface. The third surface receives the image beams, and the image beams leave the second grating by the fourth surface. An exit direction of the image beams exiting the second grating is shifted a distance in a first direction from an incident direction of the image beams incident to the first grating. The image beams are projected to form a plane image comprised of rows and columns of pixels, each pixel in the plane image is capable of being displaced from an original position through the shift of the image beams in the first direction, and a displacement of the pixel is smaller than five times a width of the pixel. Accordingly, the pixel images that a viewer may perceive are doubled in number to double the perceived image resolution, based on the visual effect known as persistence of vision.

According to another aspect of the invention, an image displacement device includes a first grating, a second grating, a third grating and a fourth grating. The first grating is switchable between a diffracting state and a non-diffracting state and has a first surface and a second surface opposite the first surface. The first surface receives an image beam, and the image beam leaves the first grating by the second surface. The second grating is switchable between a diffracting state and a non-diffracting state and is disposed downstream from the first grating in a light path. The second grating has a third surface and a fourth surface opposite the third surface, the third surface receives the image beam, and the image beam leaves the second grating by the fourth surface. A third grating is switchable between a diffracting state and a non-diffracting state and disposed downstream from the second grating in the light path. The third grating has a fifth surface and a sixth surface opposite the fifth surface, the fifth surface receives the image beam, and the image beam leaves the third grating by the sixth surface. The fourth grating is switchable between a diffracting state and a non-diffracting state and disposed downstream from the third grating in the light path. The fourth grating has a seventh surface and a eighth surface opposite the seventh surface, the seventh surface receives the image beam, and the image beam leaves the fourth grating by the eighth surface. An exit direction of the image beam exiting through the eighth surface is shifted a first distance in a first direction and shifted a second distance in a second direction from an incident direction of the image beam incident to the first surface, and the second direction is different to the first direction. Accordingly, the four gratings allow the image beam to be alternately directed to at least four different locations so as to increase the perceived image resolution at least by four times.

According to the above aspects, a diffraction grating such as an HPDLC cell may serve as a light path adjustment element to slightly shift the position of pixel images for a distance, without the need of any moving part. This may resolve the problems of noises and collision with the moving part and may increase the service life of components. Besides, a liquid crystal cell may have a short transition time to retain more optical energy. Further, using the diffraction grating may simplify a light path adjustment mechanism and is well adapted to any dimensional modifications of a passive component such as a light valve.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

FIGS. 2A and 2B show schematic diagrams of an image displacement device according to an embodiment of the invention.

FIG. 3 shows a schematic diagram illustrating offset position of pixel images according to an embodiment of the invention.

FIGS. 4A to 4D and 5A to 5D show schematic diagrams of an image displacement device according to another embodiment of the invention.

DETAILED DESCRIPTION OF THE INVENTION

The following description relates in general to an image displacement device used with an optical system (e.g., a display device or a projector) to modify or change light paths to enhance perceived image resolution, improve picture quality (e.g., eliminating dark regions or blurring image edges), or provide other beneficial effects. Further, it should be understood that the image displacement device is not limited to a specific arrangement and location in the optical system.

Figure 1A:
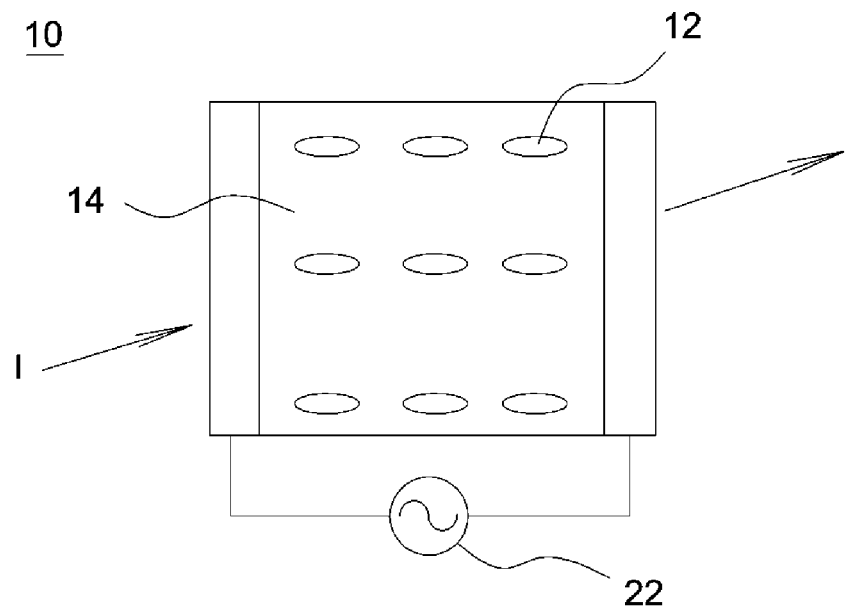
FIG. 1A and FIG. 1B show an HPDLC cell functioning as a grating according to an embodiment of the invention.
Figure 1B:
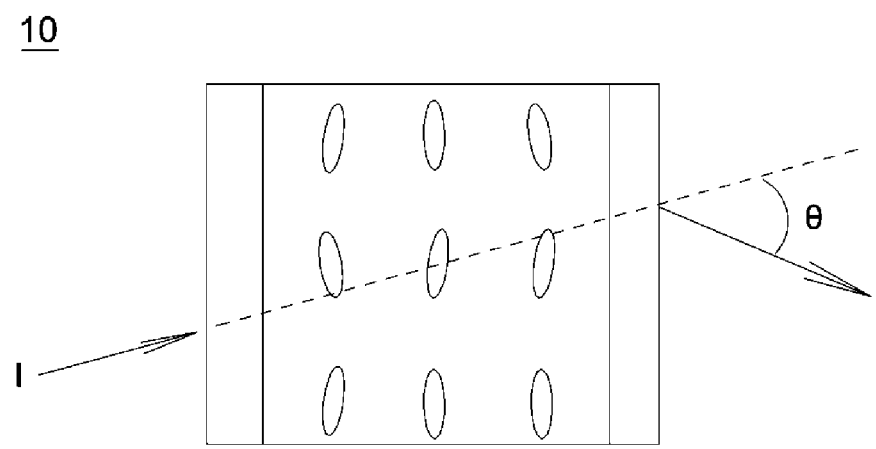

FIG. 1A and FIG. 1B show a holographic polymer dispersed liquid crystal (HPDLC) cell functioning as a grating switchable between a diffracting state and a non-diffracting state, where FIG. 1A shows a cross-section of an HPDLC cell applied with a voltage and FIG. 1B shows a cross-section of the HPDLC cell not applied with a voltage. In one embodiment, an HPDLC cell 10 functioning as a grating is switchable between a diffracting state and a non-diffracting state. As shown in FIG. 1A, when a power supply 22 applies, for example, a voltage to the HPDLC cell 10 to form a non-diffracting state, the refractive index of liquid crystals 12 is substantially the same as that of polymers 14, and thus an image beam I may travel though the HPDLC cell 10 in a substantially straight direction without being subject to optical interference. In comparison, as shown in FIG. 1B, when no voltage is applied to the HPDLC cell 10, the different refractive indices of polymers 14 and liquid crystals 12 result in light diffraction effects to form the diffracting state, and thus the image beam I incident to the HPDLC cell 10 is subject to optical interference to be deflected by the HPDLC cell 10 at an angle θ, so that the image beam I may exit the HPDLC cell 10 in a direction different to the incident direction. Note that the formation of the diffracting state and the non-diffracting state is not limited to a specific way. In other embodiment, by using liquid crystal materials with negative dielectric anisotropy or changing material property of photosensitive pre-polymer monomers, the HPDLC cell 10 may be in a diffracting state when being applied with a voltage and in a non-diffracting state when no voltage is applied.

FIGS. 2A and 2B show schematic diagrams of an image displacement device according to an embodiment of the invention. As shown in FIG. 2A and FIG. 2B, the image displacement device 110 includes a first grating 112 and a second grating 114 disposed side by side, and each of the first grating 112 and the second grating 114 is switchable between a diffracting state and a non-diffracting state. The second grating 114 is disposed downstream from the first grating 112 in a light path; that is, an image beam I first passes through the first grating 112 and then passes through the second grating 114. The first grating 112 has a surface 112a and a surface 112b opposite the surface 112a, and the second grating 114 has a surface 114a and a surface 114b opposite the surface 114a. An image beam I travels through the surface 112a and the surface 112b in succession and leaves the first grating 112 by the surface 112b. Then, the image beam I exiting the surface 112b travels through the surface 114a and the surface 114b in succession and finally leaves the second grating 114 by the surface 114b. In this embodiment, in case the first grating 112 and the second grating 114 are both in a non-diffracting state, the image beam I travels through the first grating 112 and the second grating 114 in succession in a substantially straight direction, as shown in FIG. 2A, to form a pixel image P shown in FIG. 3. In comparison, as shown in FIG. 2B, in case the first grating 112 and the second grating 114 are both in a diffracting state, the image beam I is deflected downwards by the first grating 112 at an angle θ and incident to the second grating 114, and then the image beam I is deflected upwards by the second grating 114 at an angle θ. Therefore, an exit direction of the image beam I exiting the second grating 114 is shifted in a first direction (such as the vertical direction) by a distance DS from an incident direction of the image beam I incident to the first grating 112 to form another pixel image Q shown in FIG. 3. In this embodiment, the exit direction is substantially parallel to the incident direction of the image beam I. Accordingly, when the image displacement device 110 is switched between a diffracting state and a non-diffracting state, the pixel images a viewer may perceive are doubled in number (e.g., two perceived pixel images P and Q corresponding to one physical pixel) based on the visual effect known as persistence of vision. Moreover, in this embodiment, the image beam I makes an incident angle α with respect to the surface normal of the surface 112a and an exit angle θ with respect to the surface normal of the surface 114b, and the incident angle α may be substantially equal to the exit angle θ.

Figure 6:
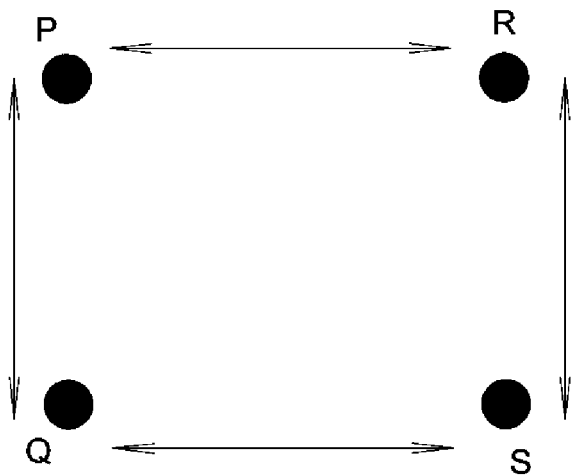
FIG. 6 shows a schematic diagram illustrating offset positions of pixel images according to another embodiment of the invention.

FIGS. 4A to 5D show schematic diagrams of an image displacement device according to another embodiment of the invention. FIGS. 4A to 4D and FIGS. 5A to 5D respectively show side views and top views of the same image displacement device under different states. In this embodiment, the image displacement device 120 includes a first grating 122, a second grating 124, a third grating 132 and a fourth grating 134, and each of them is switchable between a diffracting state and a non-diffracting state. The second grating 124 is disposed downstream from the first grating 122 in a light path, the third grating 132 is disposed downstream from the second grating 124 in the light path, and the fourth grating 134 is disposed downstream from the third grating 132 in the light path. In this embodiment, the gratings 122, 124, 132 and 134 are disposed side by side. The first grating 122 and the second grating 124 form a first displacement unit that can direct an image beam I transmitted therethrough towards at least two different positions along a first direction. The third grating 132 and the fourth grating 134 form a second displacement unit that can direct the image beam I transmitted therethrough towards at least two different positions along a second direction that is different to the first direction. Therefore, in case the orientation of grating structures of the first displacement unit is different to the orientation of grating structures of the second displacement unit, the image beam I is alternately directed to at least four different locations on a display, thereby increasing the perceived image resolution at least by four times. Referring to FIG. 4A to FIG. 5D, the first grating 122 has a surface 122a and a surface 122b opposite the surface 122a, an image beam I is received by the surface 122a and leaves the first grating 122 by the surface 122b, the second grating 124 has a surface 124a and a surface 124b opposite the surface 124a, the image beam I is received by the surface 124a and leaves the second grating 124 by the surface 124b, the third grating 132 has a surface 132a and a surface 132b opposite the surface 132a, the image beam I is received by the surface 132a and leaves the third grating 132 by the surface 132b, the fourth grating 134 has a surface 134a and a surface 134b opposite the surface 134a, the image beam I is received by the surface 134a and leaves the fourth grating 134 by the surface 134b. In this embodiment, in case the first displacement unit (gratings 122 and 124) and the second displacement unit (gratings 132 and 134) are both in a non-diffracting state, the image beam I travels through all gratings 122, 124, 132 and 134 in succession in a substantially straight direction, as shown in FIGS. 4A and 5A, to form a pixel image P shown in FIG. 6. As shown in FIGS. 4B and 5B, in case the first displacement unit (gratings 122 and 124) is in a diffracting state and the second displacement unit (gratings 132 and 134) is in a non-diffracting state, and the image beam I, as shown in FIG. 4B, is deflected by the first displacement unit (gratings 122 and 124) to shift a distance S1 in a first direction (such as the vertical direction) from its incident direction to form another pixel image Q shown in FIG. 6. As shown in FIGS. 4C and 5C, in case the first displacement unit (gratings 122 and 124) is in a non-diffracting state and the second displacement unit (gratings 132 and 134) is in a diffracting state, the image beam I, as shown in FIG. 5C, is deflected by the second displacement unit (gratings 132 and 134) to shift a distance S2 in a second direction (such as the horizontal direction) from its incident direction to form another pixel image R shown in FIG. 6. The shifting direction of the distance S2 is different to the shifting direction of the distance S1, because the orientation of grating structures of the first displacement unit is different to the orientation of grating structures of the second displacement unit. As shown in FIGS. 4D and 5D, in case the first displacement unit (gratings 122 and 124) and the second displacement unit (gratings 132 and 134) are both in a diffracting state, the image beam I is deflected by the first displacement unit (gratings 122 and 124) to shift a vertical distance S1 and deflected by the second displacement unit (gratings 132 and 134) to shift a horizontal distance S2 from its incident direction to form another pixel image S shown in FIG. 6. Therefore, the two displacement units allow the image beam I to be alternately directed to at least four different locations so as to increase the perceived image resolution at least by four times. Moreover, in this embodiment, the image beam I makes a first incident angle with respect to the surface normal of the surface 122a and makes a first exit angle with respect to the surface normal of the surface 124b, and the first incident angle may be substantially equal to the first exit angle. Further, the image beam I makes a second incident angle with respect to the surface normal of the surface 132a and makes a second exit angle with respect to the surface normal of the surface 134b, and the second incident angle may be substantially equal to the second exit angle. Therefore, the first incident angle with respect to the surface normal of the surface 122a may be substantially equal to the second exit angle with respect to the surface normal of the surface 134b.

Figure 7:
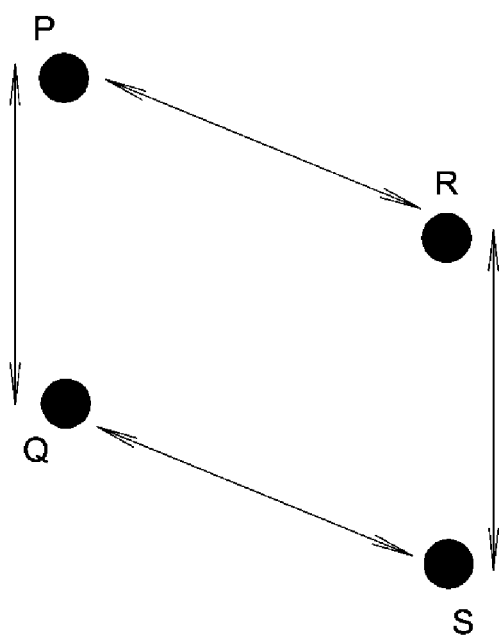
FIG. 7 shows a schematic diagram illustrating offset positions of pixel images according to another embodiment of the invention.

In the above embodiment, the two-dimensional adjustment of light paths is achieved by providing the first displacement unit (gratings 122 and 124) and the second displacement (gratings 132 and 134) with differently oriented grating structures. Therefore, by varying orientations of grating structures, the four pixel images corresponding to a physical pixel may form an orthogonal outline shown in FIG. 6 or a non-orthogonal outline shown in FIG. 7 to meet various requirements of light path adjustments. Moreover, the switch sequence of the diffracting state and the non-diffracting state, the order of arrangement, and the aligned orientations of grating structures of the first grating 122, second grating 124, third grating 132 and the fourth grating 134 are not restricted, as long as the two-dimensional image displacement is achieved. For example, in other embodiment, the first grating 122 and the third grating 132 are both in the same diffracting state or in the same non-diffracting state, and the second grating 124 and the fourth grating 134 are both in the same diffracting state or in the same non-diffracting state. In other embodiment, grating structures of the first grating 122 and the third grating 132 may have an identical first aligned orientation, grating structures of the second grating 124 and the fourth grating 134 may have an identical second aligned orientation, and the first aligned orientation is different to the second aligned orientation.

It should be noted the pixel images P, Q, R and S shown in the above figures are depicted merely for explaining the image displacement but not to illustrate actual position or proportion relationships of pixel images.

Figure 8:
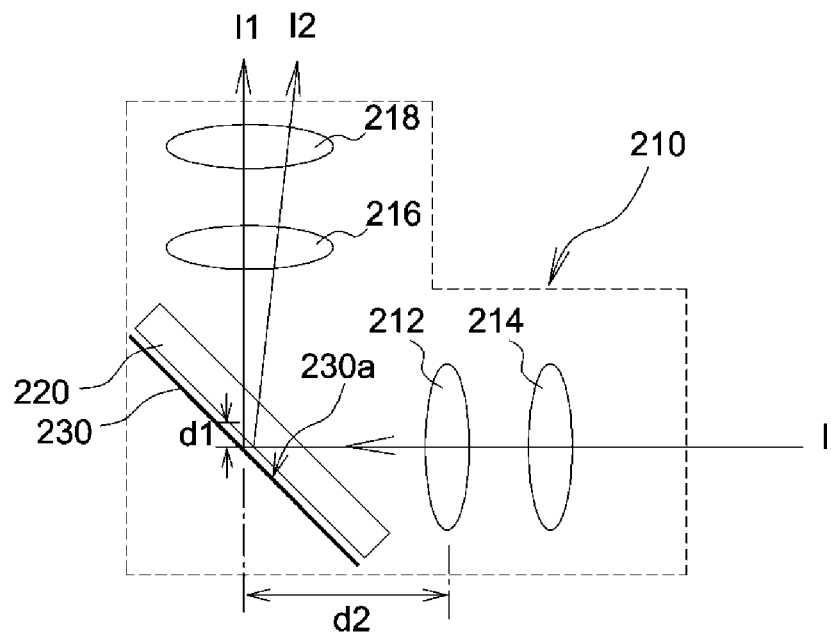
FIG. 8 shows a schematic diagram illustrating an image displacement device according to another embodiment of the invention.
Figure 9:
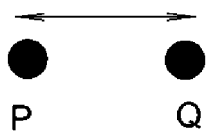
FIG. 9 shows a schematic diagram illustrating offset position of pixel images according to another embodiment of the invention.

FIG. 8 shows a schematic diagram of an image displacement device according to an embodiment of the invention. As shown in FIG. 8, an image displacement device 200 includes a projection lens 210, a grating 220 and a reflective optics 230. The grating 220 is switchable between a diffracting state and a non-diffracting state, and the reflective optics 230 has a reflective surface 230a and is disposed downstream from the grating 220 in a light path. The projection lens 210 includes a lens group having multiple lenses (such as lenses 212, 214, 216 and 218), and the grating 220 and the reflective optics 230 are located in the lens group of the projection lens 210. In this embodiment, the lens 212, among all lenses 212, 214, 216 and 218, is closest to the reflective surface 230a, and which lens is closest to the reflective surface 230a is determined by measuring a distance between the geometric center of the reflective surface 230 and the geometric center of each of the lenses 212, 214, 216 and 218. In this embodiment, a distance d1 between the grating 220 and the reflective surface 230a is smaller than a distance d2 between the lens 212 and the reflective surface 230a (d1<d2). Herein, each distance among the grating 220, the reflective surface 230a and the lens 212 is a distance among respective geometric centers of the grating 220, the reflective surface 230a and the lens 212 measured along an optical axis of the projection lens 210. The grating 220 may be, for example, a holographic polymer dispersed liquid crystal (HPDLC) cell. In case the grating 220 is in a non-diffracting state, an image beam I is incident to the reflective surface 230a in a substantially straight direction and reflected by the reflective surface 230a to form an image beam I1. In comparison, in case the grating 220 is in a diffracting state, the image beam I is deflected by the grating 220 to form an image beam I2, and the image beam I2 deflected by the grating 220 and the image beam I1 reflected by the reflective surface 230a propagate in different directions (making different angles with respect to the surface normal of the reflective surface 230a). In this embodiment, when the grating 220 is disposed overlapping or adjacent to an aperture stop of the projection lens 210, the image beam I1 and the image beam I2 respectively form a pixel image P and a pixel image Q, and the pixel image Q is shifted a distance from the pixel image P, as shown in FIG. 9. Therefore, when the image displacement device 200 switches between a diffracting state and a non-diffracting state, the image beam is directed to two different locations, and thus the pixel images that a viewer may perceive are doubled in number to double the perceived image resolution. Moreover, in case two gratings having mutually different orientations of grating structures are provided, similar to aforementioned embodiments, the image beam is alternately directed to four different locations, and thus a two-dimensional image displacement is achieved to increase the perceived resolution by four times.

Figure 10:
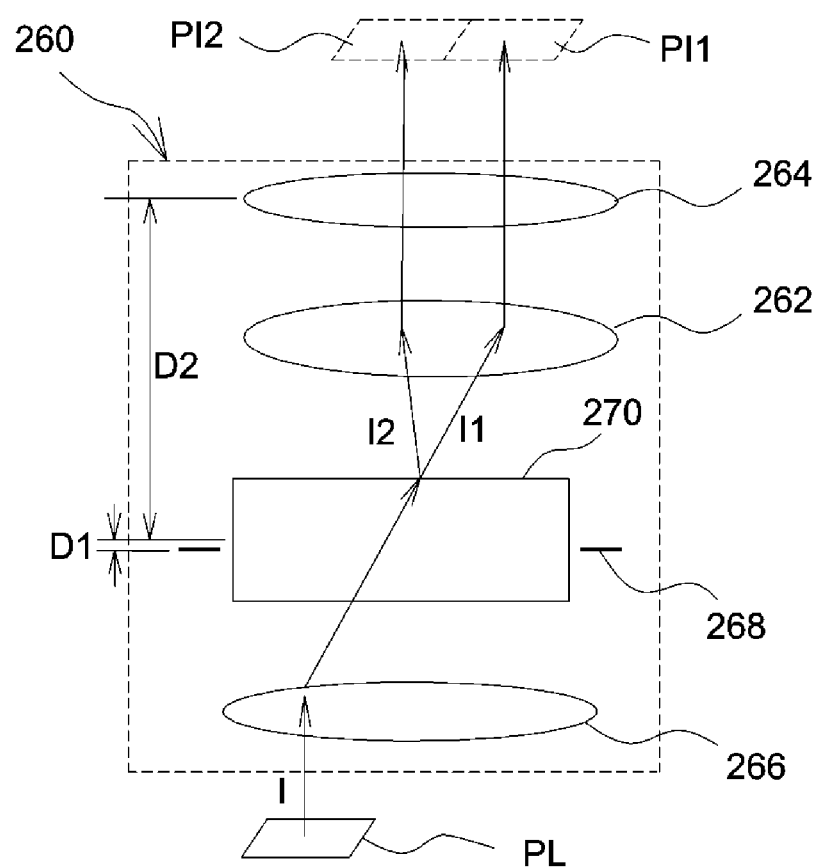
FIG. 10 shows a schematic diagram illustrating an image displacement device according to another embodiment of the invention.

FIG. 10 shows a schematic diagram of an image displacement device according to another embodiment of the invention. As shown in FIG. 10, an image displacement device 250 includes a projection lens 260 and a grating 270. The grating 270 is switchable between a diffracting state and a non-diffracting state, and the projection lens 260 includes a lens group having multiple lenses (such as a first lens 262, a second lens 264 and a third lens 266). The grating 270 may be disposed in the projection lens 260. In this embodiment, no lens with refractive power is disposed between the first lens 262 and the second lens 264, the grating 270 is disposed on one side of the first lens 262 facing away from the second lens 264, and the grating 270 is disposed overlapping or adjacent to an aperture stop 268 of the projection lens 260. In this embodiment, a distance D1 between the grating 270 and the aperture stop 268 of the projection lens 260 is smaller than a distance D2 between the grating 270 and the second lens 264 (D1<D2). Herein, each distance among the grating 270, the aperture stop 268 and the second lens 264 is a distance among respective geometric centers of the grating 270, the aperture stop 268 and the second lens 264 measured along an optical axis of the projection lens 260. The grating 270 may be, for example, a holographic polymer dispersed liquid crystal (HPDLC) cell. In case the grating 270 is in a non-diffracting state, the image beam I travels through the grating 270 in a substantially straight direction to form an image beam I1. In comparison, in case the grating 270 is in a diffracting state, the image beam I is deflected by the grating 270 to form an image beam I2. The image beam I2 deflected by the grating 270 and the image beam I1 travels through the grating 270 propagate in different directions. Therefore, when the image displacement device 250 switches between a diffracting state and a non-diffracting state, the image beam I from a pixel PL may form two image beams I1 and I2 that are directed to two different locations and respectively form a pixel image PI1 and a pixel image PI2 by the projection lens 260, and the pixel image PI2 is shifted a distance from the pixel image PI1, as shown in FIG. 10. Therefore, the pixel images that a viewer may perceive are doubled in number to double the perceived resolution. Moreover, in case two gratings having mutually different orientations of grating structures are provided, similar to aforementioned embodiments, the image beam is alternately directed to four different locations, and thus a two-dimensional image displacement is achieved to increase the perceived resolution by four times.

Figure 11:
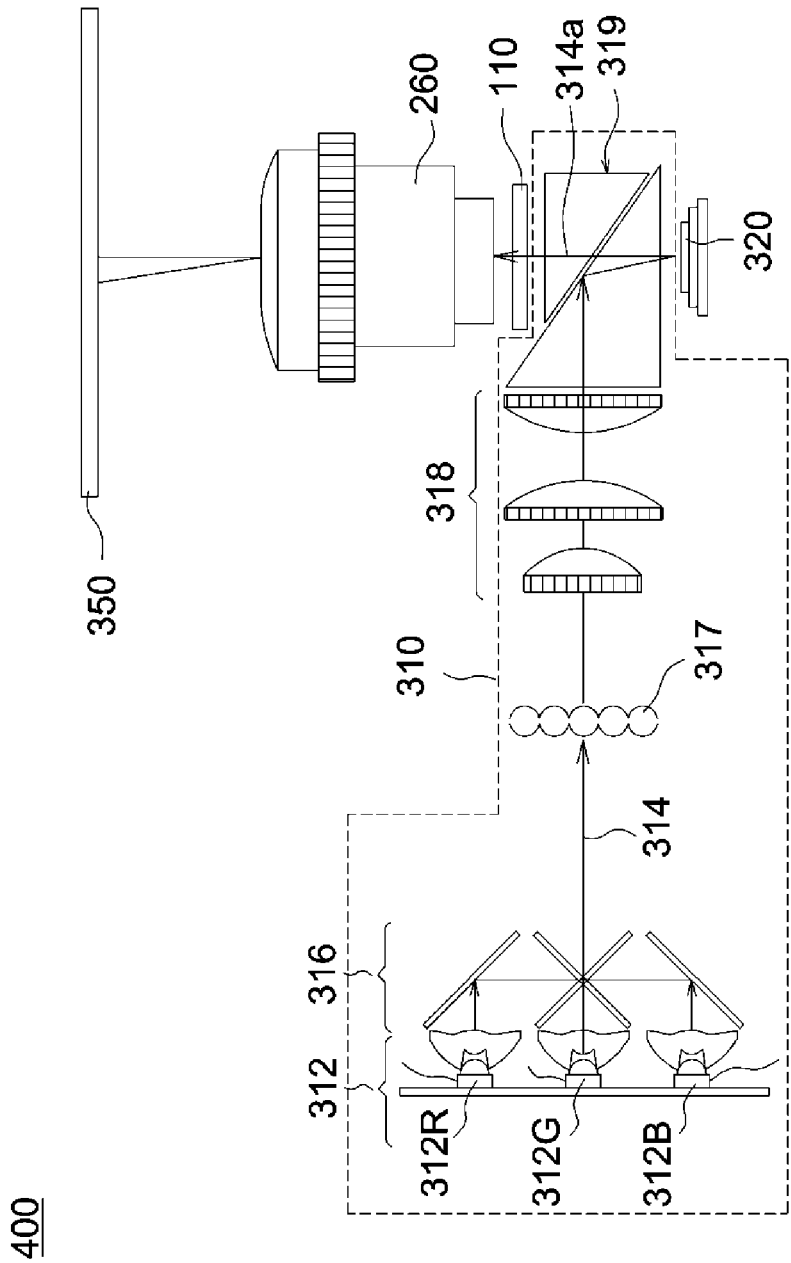
FIG. 11 shows a schematic diagram of an image displacement device used in an optical projection system according to an embodiment of the invention.
Figure 12:
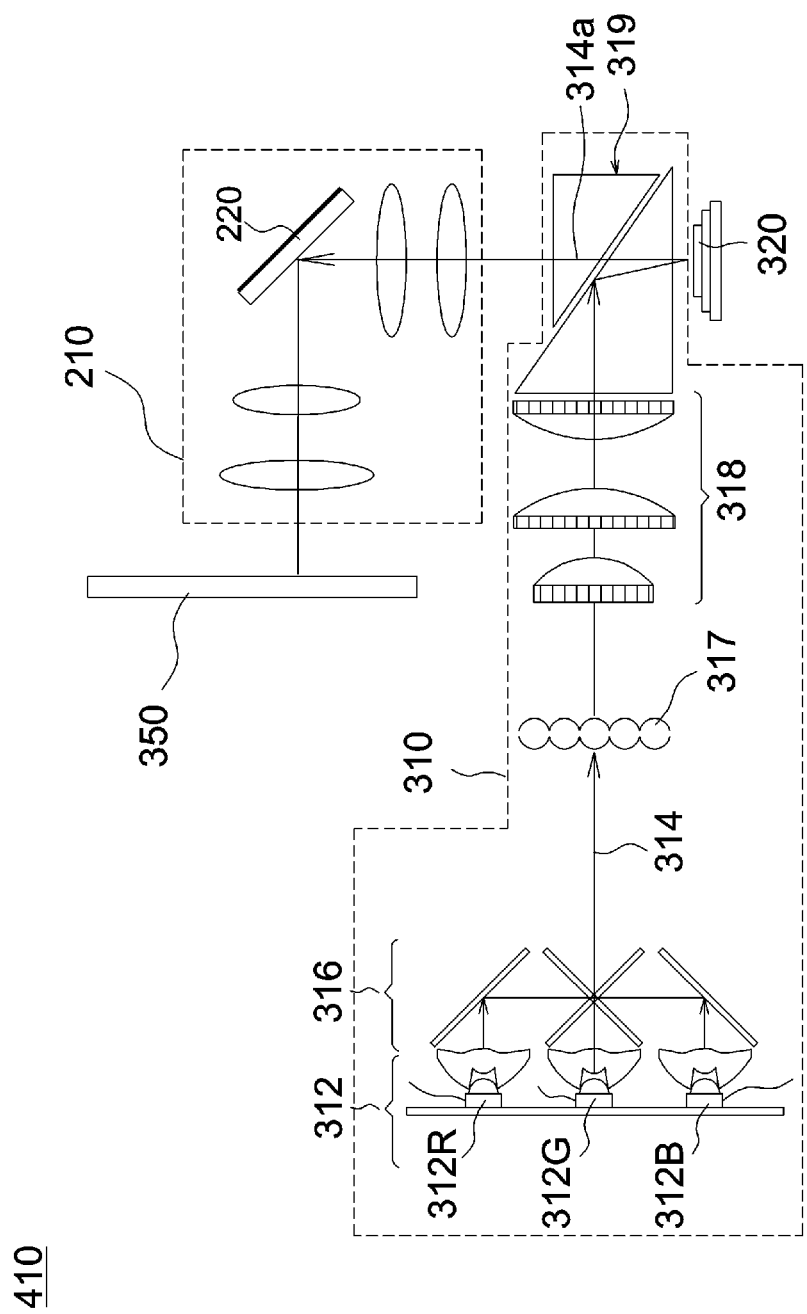
FIG. 12 shows a schematic diagram of an image displacement device used in an optical projection system according to another embodiment of the invention.

FIG. 11 shows a schematic diagram of an image displacement device used in an optical projection system according to an embodiment of the invention. Referring to FIG. 11, an optical projection system 400 includes an illumination system 310, a light valve 320, a projection lens 260 and an image displacement device 110. The illumination system 310 has a light source 312 for providing a light beam 314, and the light valve 320 is disposed in a propagation path of the light beam 314 and converts the light beam 314 into multiple sub images 314a. Besides, the projection lens 260 is disposed in a propagation path of the sub images 314a, and the light valve 320 is disposed between the illumination system 310 and the projection lens 260. For example, the image displacement device 110 may be disposed between the light valve 320 and a TIR Prism 319 or between the TIR Prism 319 and the projection lens 260. The light source 312 may, for example, include a red LED 312R, a green LED 312G and a blue LED 312B. Light from each of the LEDs 312R, 312G and 312B are combined by a light combiner 316 to form the light beam 314, and the light beam 314 passes a fly-eye lens array 317, a lens assembly 318 and the TIR Prism 319 in succession. Then, the light beam 314 is reflected by the TIR Prism 319, directed to the light valve 320, and converted into multiple sub images 314a by the light valve 320. The sub images 314a pass the TIR Prism 319 and are projected on a screen 350 by the projection lens 260. In this embodiment, when the sub images 314a reach the image displacement device 110, the image displacement device 110 may reflect the sub images 314a and alter the propagation path of the sub images 314a. Therefore, at a first time point the sub images 314a are projected on a first position (not shown) of the screen 350 by the image displacement device 110, at a second time point the sub images 314a are projected on a second position (not shown) of the screen 350 by the image displacement device 110, and the second position is shifted a distance from the first position in a horizontal direction and/or a vertical direction. In this embodiment, the image displacement device 110 is allowed to horizontally and/or vertically shift the position of the sub images 314a for a distance to therefore improve horizontally and/or vertically image resolutions. Although the image displacement device is described herein as being applied to the optical projection system 400, in other embodiments, the image displacement device can be applied to different optical systems to achieve different effects without limitation. Besides, the arrangement and position of the image displacement device in an optical system is not restricted. For example, as shown in FIG. 12, at least one grating 220 switchable between a diffracting state and a non-diffracting state may be disposed inside a projection lens 210 of an optical projection system 410.

Figure 13A:
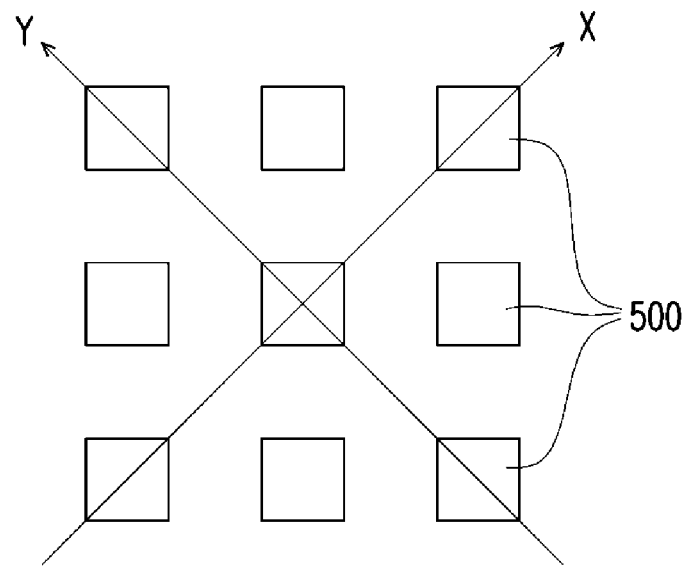
FIG. 13A shows a schematic diagram of a projected plane image not shifted by an image displacement device.
Figure 13B:
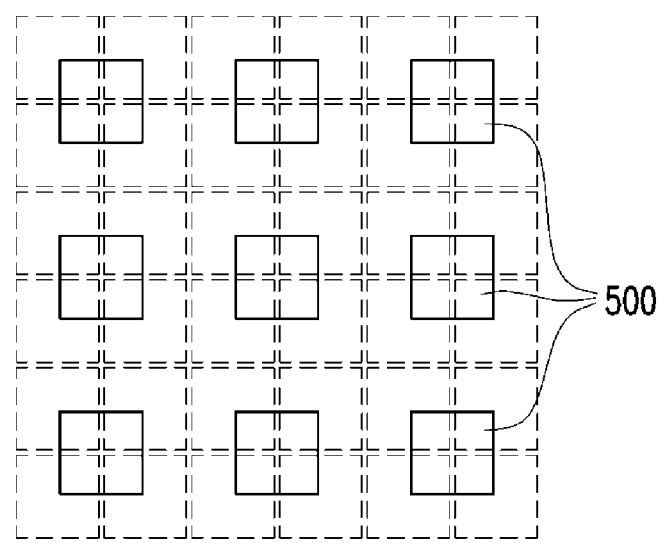
FIG. 13B illustrates a schematic diagram of a projected plane image shifted by an image displacement device according to an embodiment of the invention.

FIG. 13A illustrates a schematic diagram of a projected plane image not shifted by an image displacement device, and FIG. 13B illustrates a schematic diagram of a projected plane image shifted by an image displacement device according to an embodiment of the invention. Referring to FIGS. 13A and 13B, the plane image is comprised of rows and columns of pixels 500, and the image displacement device according to the above embodiments is allowed to move each pixel 500 to different imaging positions along one of the moving directions X and Y. In this embodiment, each pixel 500 is displaced by a fraction of pixel from the original position (solid grid) to four different imaging positions (dotted grids) in the first direction X or the second direction Y according to the arrangement of gratings, and the fraction is about 0.7. Therefore, the image resolution can be increased by four times.

Figure 14A:
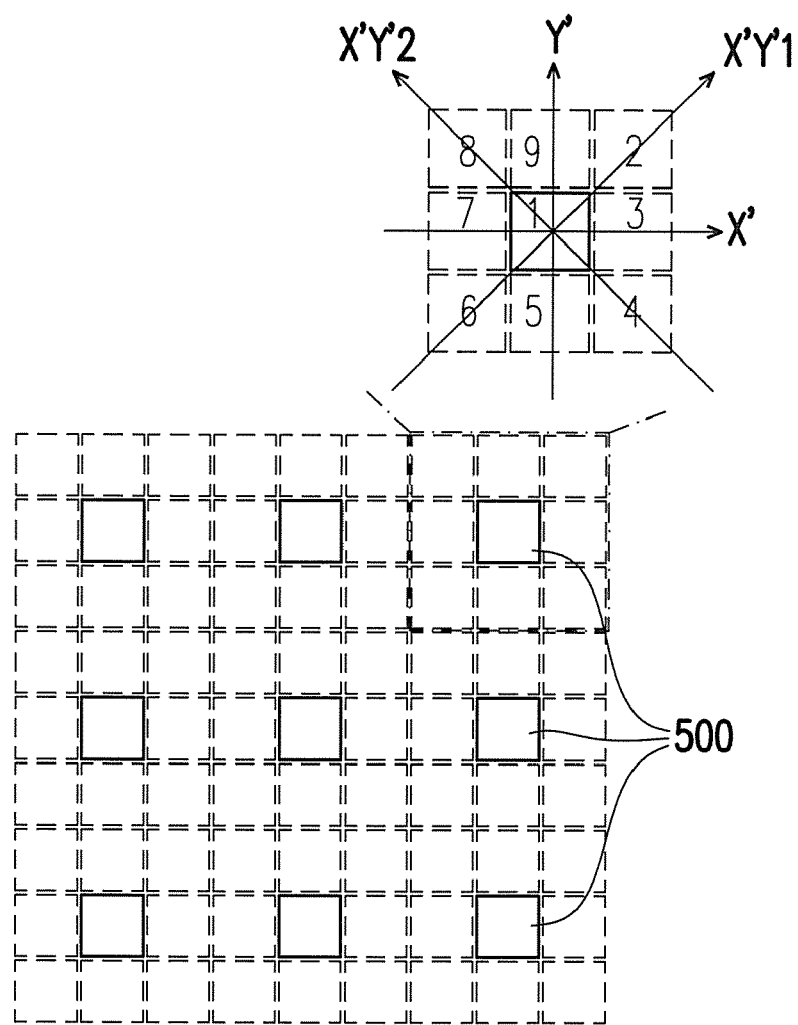
FIG. 14A shows a schematic diagram of a projected plane image shifted by an image displacement device according to another embodiment of the invention.
Figure 14B:
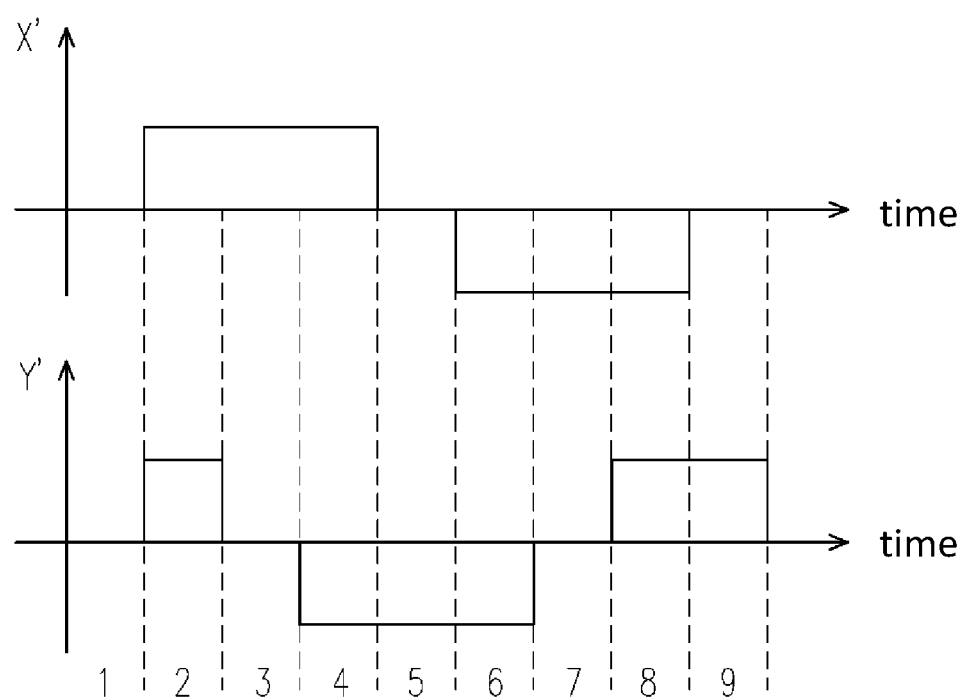
FIG. 14B illustrates different displaced directions of a pixel in respective intervals of a frame time.

FIG. 14A illustrates a schematic diagram of a projected plane image shifted by an image displacement device according to another embodiment of the invention. In this embodiment, each pixel 500 can be shifted in the directions X', Y', X'Y'1, and X'Y'2, the pixel 500 is displaced from the original position (solid grid) to a different imaging position (dotted grid) for a first distance in the direction X' and the direction Y' and for a second distance in the direction X'Y'1 and the direction X'Y'2, the first distance is substantially equal to the width of one pixel 500, and the second distance is substantially equal to 1.4 times the width of one pixel 500. Herein, the width of one pixel 500 may be measured in the row direction of the plane image comprised of rows and columns of pixels. Moreover, as shown in FIGS. 14A and 14B, numerals 1 to 9 denote different imaging positions of the same pixel at different time intervals. The plane image shows eight displaced positions in the present embodiment, but the invention is not limited thereto. The numeral 1 represents the original position (solid grid) of a pixel 500. The numerals 3 and 7 represent the displaced positions of the pixel 500 displaced in the direction X'. The numerals 5 and 9 represent the displaced positions of the pixel 500 displaced in the direction Y'. The numerals 2 and 6 represent the displaced positions of the pixel 500 displaced in the direction X'Y'1. The numerals 4 and 8 represent the displaced positions of the pixel 500 displaced in the direction X' Y'2. The numerals 1 to 9 in FIG. 14B denotes different time interval, which corresponds to the original position 1 and different displaced positions 2 to 9 shown in FIG. 14A. Further, the vertical axis of FIG. 14B represents that the pixel 500 can be shifted along different directions (direction X' and/or direction Y') within different time intervals. For instance, during the interval 1, the vertical axis values corresponding to the direction X' and the direction Y' are both 0, meaning the pixel 500 is not displaced in the direction X' and the direction Y'. During the interval 2, the vertical axis values corresponding to the direction X' and the direction Y' are both positive, meaning the pixel 500 is displaced from position 1 in the direction X'Y'1 between the direction X' and the direction Y' to position 2. During the interval 4, the vertical axis value corresponding to the direction X' is positive, the vertical axis value corresponding to the direction Y' is negative, meaning the pixel 500 is displaced from position 1 in the opposite direction of the direction X' Y' to position 4. Other numerals are defined in the same manner and are not repeated herein. Moreover, as shown in FIG. 14A, the pixel 500 can be displaced to eight different positions (dotted grids) from an original position (solid grid) without overlapping the original position, and therefore the image resolution can be increased by nine times.

Figure 15A:
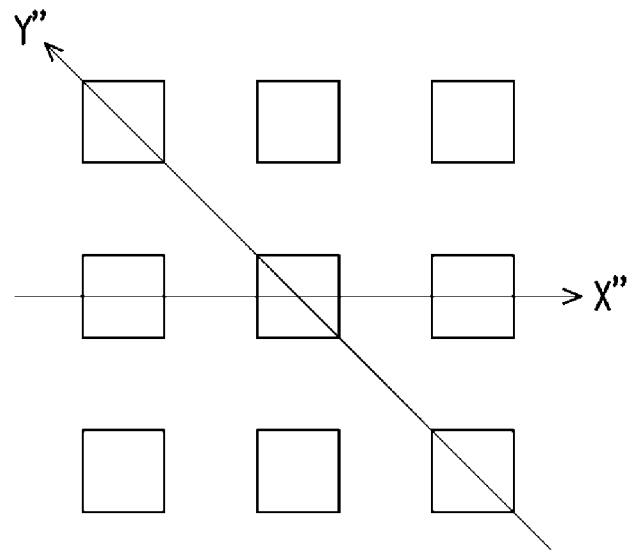
FIG. 15A shows a schematic diagram of a projected plane image not shifted by an image displacement device.
Figure 15B:
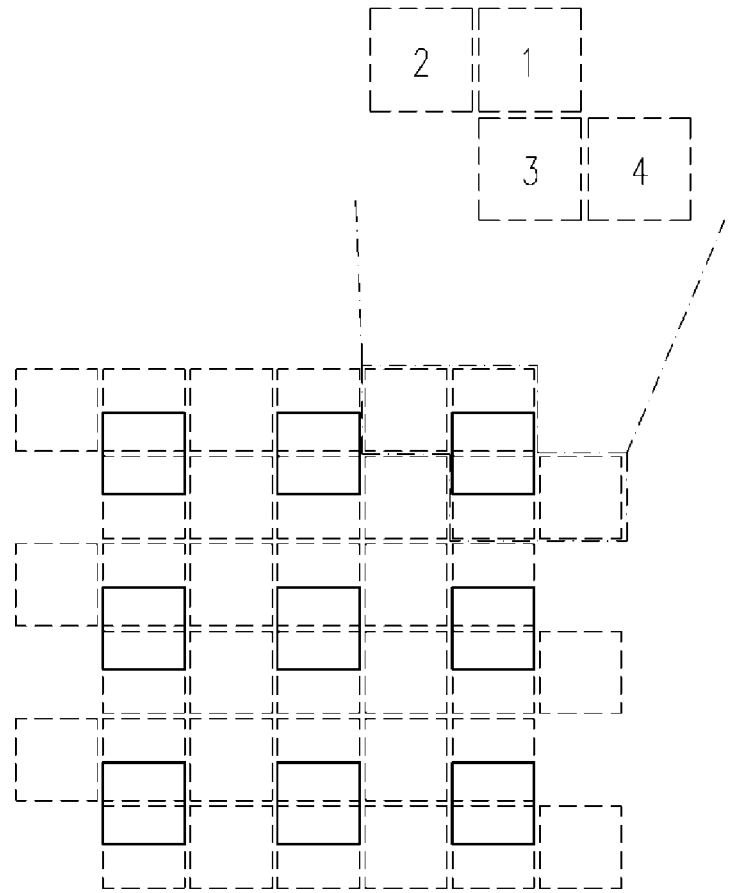
FIG. 15B illustrates a schematic diagram of a projected plane image shifted by an image displacement device according to another embodiment of the invention.

FIG. 15A illustrates a schematic diagram of a projected plane image not shifted by an image displacement device, and FIG. 15B illustrates a schematic diagram of a projected plane image shifted by an image displacement device according to another embodiment of the invention. Referring to FIG. 15A, the pixel 500 is displaced in the direction X" for a first distance and displaced in the direction Y" for a second distance, the first distance is substantially twice the width of one pixel 500, and the second distance is substantially equal to 1.1 times the width of one pixel 500. Therefore, the original position (solid grid) of the pixel 500 can be displaced to four different positions (dotted grids), and thus the image resolution can be increased by four times.

In various embodiments of the invention, the pixel is capable of being displaced from an original position by the image displacement module, the number of the displaced positions for a pixel may be smaller than 10, and the displacement of the pixel may be smaller than five times a width of the pixel, more preferably smaller than twice a width of the pixel.

Based on the above embodiments, a fabrication method of an image displacement device according to an embodiment of the invention is described below. First, a first grating and a second grating are disposed in a housing, and each of the first grating and the second grating is switchable between a diffracting state and a non-diffracting state. The first grating has a first surface and a second surface opposite the first surface, the first surface receives image beams, and the image beams leave the first grating by the second surface. The second grating is disposed downstream from the first grating in a light path and has a third surface and a fourth surface opposite the third surface. The third surface receives the image beams, and the image beams leave the second grating by the fourth surface. An exit direction of the image beams exiting the second grating is shifted a distance in a first direction from an incident direction of the image beams incident to the first grating. The image beams are projected to form a plane image comprised of rows and columns of pixels, each pixel in the plane image is capable of being displaced from an original position through the shift of the image beams in the first direction, and the displacement of the pixel is smaller than five times a width of the pixel.

According to the above embodiments, a diffraction grating such as an HPDLC cell may serve as a light path adjustment element to slightly shift the position of pixel images for a distance, without the need of any moving part. This may resolve the problems of noises and collision with the moving part and may increase the service life of components. Besides, a liquid crystal cell may have a short transition time to retain more optical energy. Further, using the diffraction grating may simplify a light path adjustment mechanism and is well adapted to any dimensional modifications of a passive component such as a light valve.

The term "optical element" refers to an element made from at least in part a material that may refract, reflect, diffract, diffuse or filter at least a portion of the light passing through it. The material may include plastic or glass, and the optical element may be, for example, a lens, a prism or a reflective mirror.

The term "light valve", which is commonly known in the projector industry, refers to individually-addressed optical units of a spatial light modulator. The spatial light modulator includes multiple individually-addressed optical units arranged as a one-dimensional or a two-dimensional array. Each optical unit can be individually addressed by optical or electrical signals to alter its optical properties through various physical effects (e.g., Pockels effect, Kerr effect, photoacoustic effect, pagneto-optic effect, self electro-optic effect or photorefractive effect). Therefore, the multiple individually addressed optical units may modify incoming light beams and output image beams. The optical units may be, for example, micro mirrors or liquid crystal cells, and the light valve may be a digital micro-mirror device (DMD), a liquid-crystal-on-silicon panel (LCOS panel) or a transmissive type LCD panel.

An optical projection system or a projector is an apparatus capable of casting an image on a screen through optical projection. In the projector industry, a variety of different types of projectors, which are distinguished from each other by the type of a light valve, may include a cathode-ray-tube type, a liquid-crystal-display (LCD) type, a digital-light-projector (DLP) type or a liquid-crystal-on-silicon (LCOS) type. An LCD-type projector that uses an LCD as a light valve is a transmissive type projector. A DLP-type projector using digital micro-mirror devices as a light valve and an LCOS-type projector using liquid crystal on silicon as a light valve are reflective type projectors that project images through light reflection. In this embodiment, the projector is a DLP-type projector and the light valve 320 is a digital micro-mirror device.

Though the embodiments of the invention have been presented for purposes of illustration and description, they are not intended to be exhaustive or to limit the invention. Accordingly, many modifications and variations without departing from the spirit of the invention or essential characteristics thereof will be apparent to practitioners skilled in this art. It is intended that the scope of the invention be defined by the claims appended hereto and their equivalents in which all terms are meant in their broadest reasonable sense unless otherwise indicated.

What is claimed is:

1. An image displacement device, comprising:
   a first grating switchable between a diffracting state and a non-diffracting state having a first surface and a second surface opposite the first surface, the first surface being capable of receiving an image beam, and the second surface being capable of outputting the image beam;
   a second grating switchable between the diffracting state and the non-diffracting state and being disposed downstream from the first grating in a light path, the second grating having a third surface and a fourth surface opposite the third surface, the third surface being capable of receiving the image beam, and the fourth surface being capable of outputting the image beam;
   a third grating switchable between the diffracting state and the non-diffracting state and being disposed downstream from the second grating in the light path, the third grating having a fifth surface and a sixth surface opposite the fifth surface, the fifth surface being capable of receiving the image beam, and the sixth surface being capable of outputting the image beam; and
   a fourth grating switchable between the diffracting state and the non-diffracting state and being disposed downstream from the third grating in the light path, the fourth grating having a seventh surface and a eighth surface opposite the seventh surface, the seventh surface being capable of receiving the image beam, and the eighth surface being capable of outputting the image beam, wherein the image beam outputted from the eighth surface is capable of being projected on four different positions on a same plane, and the four different positions are not all aligned in a same line.

2. The image displacement device as claimed in claim 1, wherein the image beam is capable of making a first incident angle with respect to a surface normal of the first surface and is capable of making a first exit angle with respect to the surface normal of the eighth surface, and the first incident angle is substantially equal to the first exit angle.

3. The image displacement device as claimed in claim 1, wherein the image beam incident to the first surface is substantially parallel to the image beam outputted from the fourth surface.

4. The image displacement device as claimed in claim 1, wherein each of the first grating, the second grating, the third grating and the fourth grating is a holographic polymer dispersed liquid crystal (HPDLC) cell.

5. The image displacement device as claimed in claim 1, wherein the first grating and the second grating are both in a diffracting state or both in a non-diffracting state.

6. The image displacement device as claimed in claim 1, wherein the third grating and the fourth grating are both in a diffracting state or both in a non-diffracting state.

7. The image displacement device as claimed in claim 1, wherein two of the first to the fifth gratings have an identical first orientation of grating structures, and the other two of the first to the fifth gratings have an identical second orientation of grating structures, and the second orientation is different to the first orientation.

8. The image displacement device as claimed in claim 7, wherein, when the first grating, the second grating, the third grating and the fourth grating are both in a non-diffracting state, the image beam is capable of travelling through the first grating, the second grating, the third grating and the fourth grating in a substantially straight direction.

9. The image displacement device as claimed in claim 7, wherein, when the first grating and the second grating are in a diffracting state, the image beam is capable of being deflected by the first grating and the second grating, and, when the third grating and the fourth grating are in a diffracting state, the image beam is capable of being deflected by the third grating and the fourth grating.

10. The image displacement device as claimed in claim 7, wherein, when the first grating, the second grating, the third grating and the fourth grating are both in a diffracting state, the image beam is deflected by the first grating and the second grating to shift in a first direction and deflected by the third grating and the fourth grating to shift in a second direction.

11. The image displacement device as claimed in claim 1, wherein the four different positions includes a first position, a second position, a third position and a fourth position, and a shortest distance between the first position and the second position is substantially equal to a shortest distance between the third position and the fourth position.

12. The image displacement device as claimed in claim 1, wherein the four different positions includes a first position, a second position, a third position and a fourth position, and a line connected between the first position and the second position is substantially parallel to a line connected between the third position and the fourth position.

13. An image displacement device, comprising:
   a first grating switchable between a diffracting state and a non-diffracting state having a first surface and a second surface opposite the first surface, the first surface being capable of receiving an image beam, and the second surface being capable of outputting the image beam;
   a second grating switchable between the diffracting state and the non-diffracting state and being disposed downstream from the first grating in a light path, the second grating having a third surface and a fourth surface opposite the third surface, the third surface being capable of receiving the image beam, and the fourth surface being capable of outputting the image beam;
   a third grating switchable between the diffracting state and the non-diffracting state and being disposed downstream from the second grating in the light path, the third grating having a fifth surface and a sixth surface opposite the fifth surface, the fifth surface being capable of receiving the image beam, and the sixth surface being capable of outputting the image beam; and a fourth grating switchable between the diffracting state and the non-diffracting state and being disposed downstream from the third grating in the light path, the fourth grating having a seventh surface and a eighth surface opposite the seventh surface, the seventh surface being capable of receiving the image beam, and the eighth surface being capable of outputting the image beam, wherein the image beam outputted from the eighth surface is capable of being projected on four different positions, and a shortest distance between two of the four different positions is substantially equal to a shortest distance between the other two of the four different positions.

14. The image displacement device as claimed in claim 13, wherein the image beam is capable of making a first incident angle with respect to a surface normal of the first surface and is capable of making a first exit angle with respect to the surface normal of the eighth surface, and the first incident angle is substantially equal to the first exit angle.

15. The image displacement device as claimed in claim 13, wherein the first grating and the second grating are both in a diffracting state or both in a non-diffracting state.

16. The image displacement device as claimed in claim 13, wherein the third grating and the fourth grating are both in a diffracting state or both in a non-diffracting state.

17. The image displacement device as claimed in claim 13, wherein two of the first to the fifth gratings have an identical first orientation of grating structures, and the other two of the first to the fifth gratings have an identical second orientation of grating structures, and the second orientation is different to the first orientation.

18. The image displacement device as claimed in claim 17, wherein, when the first grating, the second grating, the third grating and the fourth grating are both in a non-diffracting state, the image beam is capable of travelling through the first grating, the second grating, the third grating and the fourth grating in a substantially straight direction.

19. The image displacement device as claimed in claim 17, wherein, when the first grating and the second grating are in a diffracting state, the image beam is capable of being deflected by the first grating and the second grating, and, when the third grating and the fourth grating are in a diffracting state, the image beam is capable of being deflected by the third grating and the fourth grating.

20. The image displacement device as claimed in claim 13, wherein the image beam incident to the first surface is substantially parallel to the image beam outputted from the fourth surface.

* * * * *